United States Patent [19]

Nakahara

[11] Patent Number: 5,160,833
[45] Date of Patent: Nov. 3, 1992

[54] MAGNETIC RECORDING MEDIUM HAVING AUTHENTICATING POLES AT ITS EDGE

[75] Inventor: Yoshihiko Nakahara, Tokyo, Japan

[73] Assignee: Kyodo Printing Co., Ltd., Tokyo, Japan

[21] Appl. No.: 818,747

[22] Filed: Jan. 7, 1992

Related U.S. Application Data

[63] Continuation of Ser. No. 582,199, filed as PCT/JP88/00369, Apr. 14, 1988, abandoned.

[30] Foreign Application Priority Data

Nov. 13, 1986 [JP] Japan ................... 61-268683

[51] Int. Cl.$^5$ .................. G06K 7/08; G06K 19/06
[52] U.S. Cl. ........................... 235/449; 235/494
[58] Field of Search .......... 235/379, 380, 382, 384, 235/449, 450, 493, 494

[56] References Cited

U.S. PATENT DOCUMENTS

| | | | |
|---|---|---|---|
| 3,293,629 | 12/1966 | Oliver | 235/493 |
| 3,761,683 | 9/1973 | Rogers | 235/382 X |
| 3,788,617 | 1/1974 | Barney | 235/493 |
| 3,790,754 | 2/1974 | Black et al. | 235/493 X |
| 3,885,130 | 5/1975 | Moulton et al. | 235/450 |
| 3,984,658 | 10/1976 | Cannon | 235/450 X |
| 3,995,145 | 11/1976 | Harris | 235/450 |
| 4,385,231 | 5/1983 | Mizutani et al. | 235/382 |
| 4,455,484 | 6/1984 | Whitehead | 235/493 |
| 4,562,490 | 12/1985 | Barth et al. | 360/44 |
| 4,849,618 | 7/1989 | Namikawa et al. | 235/493 |
| 4,916,294 | 4/1990 | Goldman | 235/449 |
| 4,937,436 | 6/1990 | Eglise et al. | 235/449 X |

FOREIGN PATENT DOCUMENTS

| | | | |
|---|---|---|---|
| 59-094188 | 5/1984 | Japan | 235/493 |
| 63-124220 | 5/1988 | Japan . | |
| 1338232 | 12/1970 | United Kingdom . | |
| 1392038 | 4/1975 | United Kingdom | 235/493 |
| WO/8909981 | 10/1989 | World Int. Prop. O. | 235/494 |

Primary Examiner—John W. Shepperd
Assistant Examiner—Edward Sikorski
Attorney, Agent, or Firm—Baker & Daniels

[57] ABSTRACT

A magnetic recording medium includes a truth determining code for determining whether the medium is authentic. The truth determining code is indicated by a magnetic polarity at at least an edge of the medium. A method of determining whether the medium is authentic comprises the steps of detecting a magnetic polarity at an edge of the magnetic recording medium, and collating a combination of the magnetic polarity with a proper combination of the magnetic polarity.

2 Claims, 2 Drawing Sheets

MAGNETIC RECORDING MEDIUM HAVING AUTHENTICATING POLES AT ITS EDGE

This is a continuation of application Ser. No. 07/582,199, filed filed as PCT/JP88/00369, Apr. 14, 1988, now abandoned.

BACKGROUND OF THE INVENTION

The present invention relates to a magnetic recording medium and a method of determining whether the medium is true or false, and more particularly to an improvement in security of the magnetic recording medium.

The present invention is adapted to a magnetic recording medium, e.g., a magnetic card requiring an unfair use preventing function and a forgery and alteration preventing function.

Conventionally, the security or protection of the magnetic card, for example, is improved by a method wherein azimuth magnetic recording is carried out to prevent the forgery by a usual reader-writer, a method using a magnetic bar code, or a method using a magnetic mark.

However, the conventional methods as mentioned above require a special magnetic card and a special reader-writer, causing complication of a card system.

SUMMARY OF THE INVENTION

Accordingly, it is an object of the present invention to provide a magnetic recording medium which improves security with a simple system.

It is another object of the present invention to provide a method of determining whether a magnetic recording medium is authentic which improves security with a simple system.

According to one aspect of the present invention, there is provided a magnetic recording medium wherein a magnetic polarity at at least an edge of the recording medium is indicative of a truth determining code of the recording medium.

According to another aspect of the present invention, there is provided a method of determining whether a magnetic recording medium is authentic, comprising the steps of detecting a magnetic polarity at an edge of the magnetic recording medium, and collating a combination of the magnetic polarity with a proper combination of the magnetic polarity.

As mentioned above, the truth determining code is recorded at the edge of the magnetic recording medium. Therefore, it is hard to read the truth determining code by a magnetic viewer or the like. Furthermore, whether the magnetic recording medium is true or false is determined by collating the combination of the magnetic polarity at the edge with a proper combination. Therefore, as far as the system of the truth determining code is unknown, it is impossible to forge or alter the magnetic recording medium.

Other objects and features of the invention will be more fully understood from the following detailed description and appended claims when taken with the accompanying drawings.

DETAILED DESCRIPTION OF THE PREFERRED EMBODIMENTS

There will now be described some preferred embodiments of the present invention with reference to the drawings.

Figure 1:
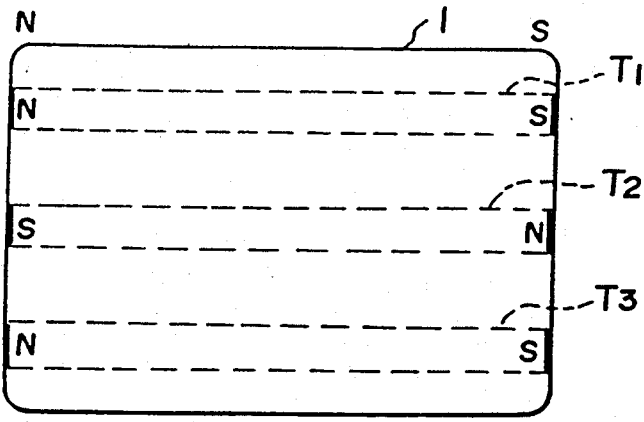
FIG. 1 is a schematic plan view of a first preferred embodiment of the magnetic recording medium according to the present invention.

FIG. 1 is a schematic plan view of a first preferred embodiment of the magnetic recording medium according to the present invention.

Referring to FIG. 1, a magnetic card 1 is provided with a magnetic layer whose magnetic polarity is oriented in one direction. The magnetic layer is provided with three magnetic tracks T1-T3. As appreciated from FIG. 1, the magnetic polarity at opposite edges of the track T2 only is inverted, for example. Therefore, as will be hereinafter described, the combination of N-S-N or S-N-S may be obtained by detecting the magnetic polarity at the edges of the tracks, and this combination may be utilized as a truth determining code for the magnetic card. In this embodiment, the number of combination is $2^3=8$, that is, eight kinds of discrimination may be effected.

The truth determining code may be decided in accordance with a desired content recorded on the tracks T1-T3, such as personal information and amount of money. For example, when the magnetic card 1 is a prepaid card, a remainder changes every time the card is used. Therefore, the truth determining code is decided in accordance with the remainder, and this code is updated every time the card is used. Accordingly, if the remainder is unfairly altered, such alteration can be easily discovered.

The magnetic card may be easily manufactured by forming the magnetic layer to be usually adopted and arbitrarily inverting the magnetic polarity. Thus, any special processes or steps are not necessary.

Figure 2:
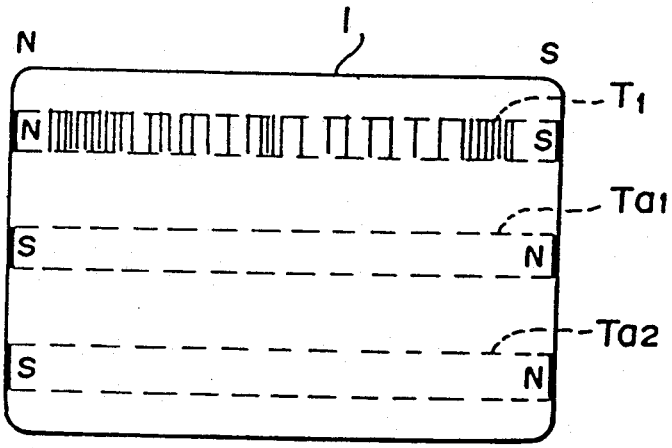
FIG. 2 is a schematic plan view of a second preferred embodiment of the magnetic recording medium according to the present invention.

FIG. 2 is a schematic plan view of a second preferred embodiment of the magnetic recording medium according to the present invention. In this embodiment, a data track T1 is formed independently of tracks Ta1 and Ta2 including the truth determining code.

Figure 3:
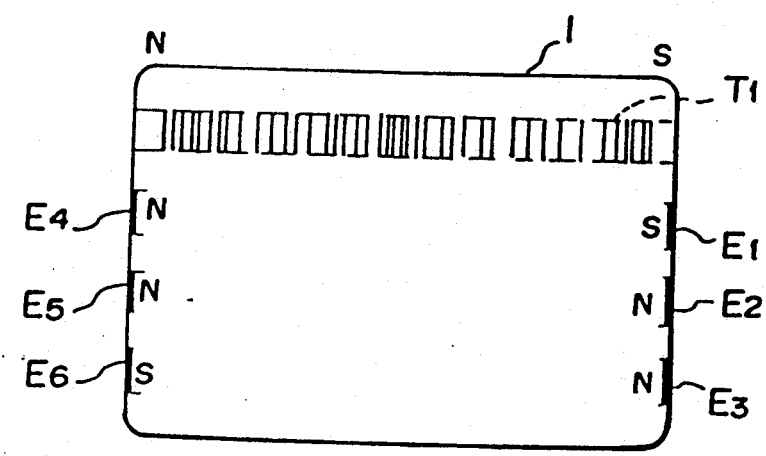
FIG. 3 is a schematic plan view of a third preferred embodiment of the magnetic recording medium according to the present invention.

FIG. 3 is a schematic plan view of a third preferred embodiment of the magnetic recording medium according to the present invention. In this embodiment, the magnetic polarity at edges E1-E6 only is inverted or non-inverted, and such is utilized as the truth determining code. In this case, the number of combination of the polarity becomes $2^6$.

As the inversion or the non-inversion of the magnetic polarity at the edges only is utilized, such cannot be read by a magnetic viewer. Further, in the case that the magnetic polarity at the edges is not inverted with respect to the orientation of the magnetic polarity of the magnetic layer, it is greatly hard to read a position of the truth determining code.

Figure 4:
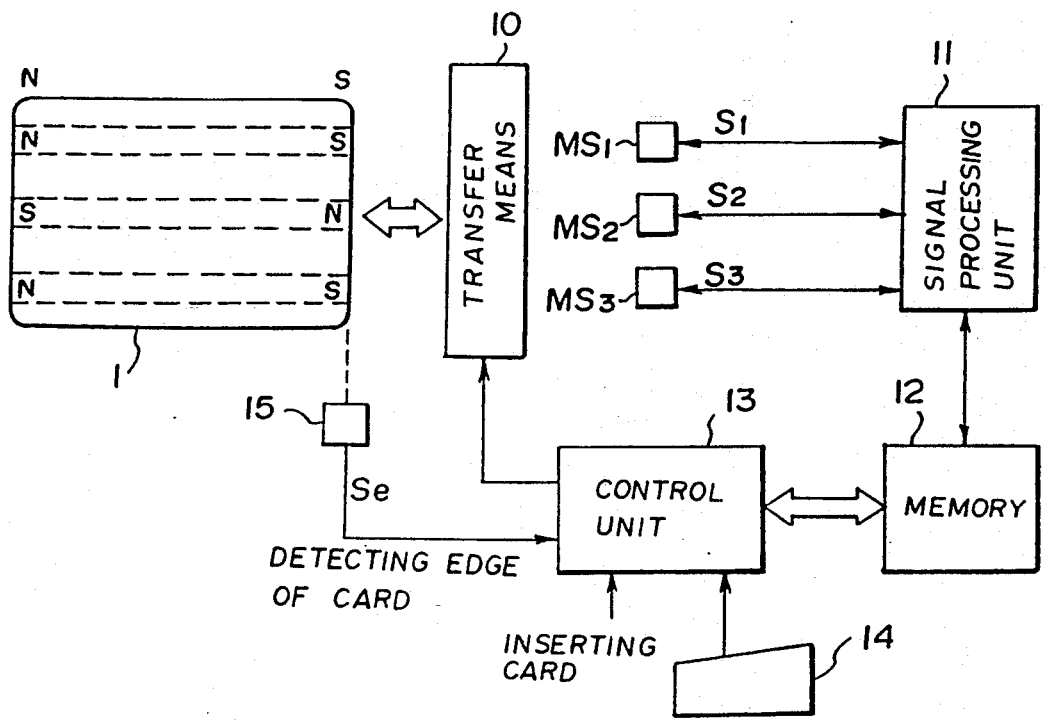
FIG. 4 is a schematic diagrammatic view of a reader-writer for carrying out a preferred embodiment of the truth determining method according to the present invention.
Figure 5:
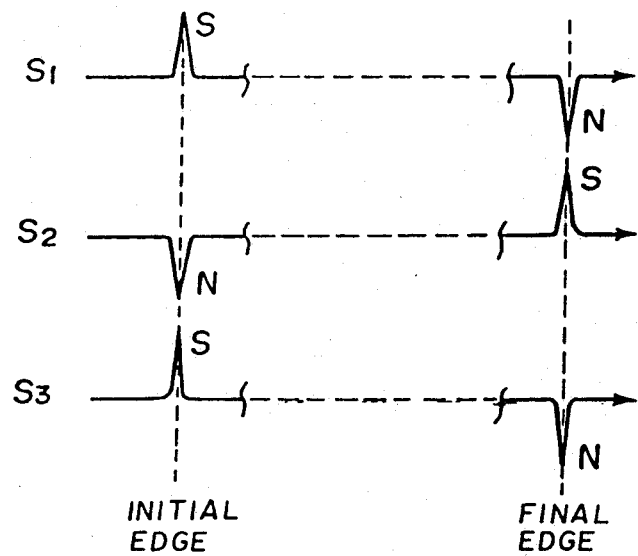
FIG. 5 is a waveform chart of sensor outputs of magnetic heads.

FIG. 4 is a schematic diagrammatic view of a reader-writer for carrying out a preferred embodiment of the truth determining method according to the present invention, and FIG. 5 is a waveform chart of sensor outputs of magnetic heads.

Referring to FIG. 4, the magnetic card 1 is a prepaid card as shown in FIG. 1, and has three magnetic recording tracks at whose edges the truth determining code is recorded.

The magnetic card 1 is movable by a transfer means 10 in the directions as depicted by a double-headed arrow in FIG. 4, and the information recorded on each track is adapted to be read by magnetic heads MS1-MS3.

Signals S1-S3 read are adapted to be input to a signal processing unit 11 where signal processing such as amplification and AD conversion is carried out, and the signals thus processed are adapted to be stored in a memory 12.

The information stored in the memory 12 is processed, e.g., calculated or modified by a control unit 13 as required. The control unit 13 is connected to an input unit 14 such as a ten-key unit for inputting a purchase price, for example. The control unit 13 is also connected to a sensor 15 for detecting the edges of the card 1, a display unit (not shown), etc.

The operation of this embodiment will now be described with reference to FIGS. 4 and 5.

First, when the card 1 is inserted into the reader-writer, the transfer means 10 is operated by the control unit 13 to draw the card 1 into the device. When the edge of the card 1 is detected by the sensor 15, the signals S1-S3 read as the information of the card 1 are stored in the memory 12 after a fixed period of time is elapsed.

Outputs from the magnetic heads MS1-MS3 are inverted according to the magnetic polarity, and as shown in FIG. 5, the combination of S-N-S at the initial edge and the combination of N-S-N at the final edge are obtained as the truth determining code.

Then, a desired information (remainder or personal information, for example) in the memory 12 is read by the control unit 13, and a proper code is calculated by a predetermined operation. Then, the code read at the initial edge and the final edge is collated with the proper code. If the code read accords with the proper code, it is determined that the card 1 is true, and the subsequent operation is carried out. If the disaccordance between the code read and the proper code occurs a predetermined times or more, it is determined that the card 1 has been forged or altered, and the card 1 is not accepted.

If the card 1 is true, a purchase price, for example, is input by a user with the input unit 14, the remainder is read by the control unit 13 from the information stored in the memory 12, and the purchase price is subtracted from the remainder. Then, the difference is stored again in the memory 12. At this time, when the difference or a fresh remainder is not more than a fixed amount, for example, the truth determining code is modified and stored in the memory 12. For example, the truth determining code is changed into the combination of S-N-N at the initial edge and the combination of N-S-S at the final edge.

When the necessary processing is ended, the transfer means 10 is operated by the control unit 13 to reverse the card 1. At this time, the information in the memory 12 is read by the control unit 13, and the information including the truth determining code is written on the tracks T1-T3 of the card 1 by means of the magnetic heads MS1-MS3. Then, the card 1 thus updated is returned to the user.

As described above, the truth determining code is recorded at the edges of the card 1, indicative of the inversion or non-inversion of the magnetic polarity. Therefore, even if the information in the card 1 is merely read by a reader or the like, the card 1 cannot be forged as far as the system of the truth determining code is unknown. Thusly, a greatly high security may be obtained by a simple method.

The above-mentioned embodiments are illustrative and may be modified or changed within the scope of the present invention. For example, the present invention is applicable to the determination of the truth of a general magnetic recording medium.

What is claimed is:

1. A magnetic recording medium having a magnetic layer, said magnetic layer including at least one magnetic recording track formed in said magnetic layer in one direction, two edges of said recording medium being oriented perpendicular to the direction of the recording track and bearing a truth determining code, said code comprising a combination of polarities of magnetic poles formed at predetermined positions of the magnetic layer, which predetermined positions include both of said edges of the recording track, said truth determining code having a predetermined relationship to the contents recorded in the recording track.

2. A method of determining whether a magnetic recording medium having a magnetic layer and at lest one magnetic recording track formed in the magnetic layer in one direction is authentic, comprising the steps of:

detecting polarities of magnetic poles by means of at least one magnetic head, said magnetic poles being formed at predetermined positions of the magnetic layer at two edges of the medium, said edges being oriented perpendicular to the direction of the recording track so that a truth determining code is formed thereby, said truth determining code comprising a combination of said polarities formed at said predetermined positions of the magnetic layer, said predetermined positions including both of said edges of the recording track, reading the contents recorded in the recording track by means of the magnetic head, when moving the magnetic head relative to the medium for the detecting step, to form a comparative code, collating the truth determining code with the comparative code, and determining the authenticity of said medium by determining whether the truth determining code and the comparative code are related.

* * * * *